2,820,712

NON-GRAIN-RAISING STAIN COMPOSITIONS AND ARTICLES PREPARED THEREFROM

Paul A. Blachman, Reading, Pa., assignor to The Glidden Company, Cleveland, Ohio, a corporation of Ohio No Drawing. Application March 30, 1955
Serial No. 498,093

3 Claims. (Cl. 106—34)

This invention relates to improved non-grain-raising stains for wood and like cellulosic construction materials. It relates particularly to novel organic solvent solutions of metallized dyes of the metachrome azo type described more specifically hereinafter, which solutions are suitable for use in staining wood or in coloring organic coatings, e. g., in preparing shading lacquers and colored transparent lacquers.

Accordingly, the primary object of my invention is to provide novel non-grain-raising stains for wood and related compositions.

Another object is to provide novel articles prepared from said stains and/or compositions.

These and other objects will be apparent from the following description of my invention.

I have found that the premetallized, e. g., metachrome, azo dyestuffs of U. S. Patent No. 2,551,056, which are presently available for use in dyeing wool, silk, nylon and like non-cellulosic textile materials, can be dissolved in diverse organic solvents, such as alcohols and mixtures of alcohols with esters, ketones and aromatic hydrocarbons to provide solutions of sufficient strength to be useful in staining wood. Since lacquers and urea-alkyd low-bake synthetic coatings conventionally contain solvents of the types mentioned in appropriate proportions for dissolving moderate amounts of the dyes, the dyes can be used for coloring such lacquers thereby to provide clear, colored lacquer films. A wide range of colors is available in the dyes and can be dissolved in solvents or lacquers, and I have found that the resulting solutions give stained or colored films having good resistance to fading in sunlight when compared with the acid dyestuffs normally used in non-grain-raising stains. When the solutions are used for staining wood, they provide stained surfaces of exceptional depth and clarity of color, and impart a three-dimensional color effect usually attainable only by multiple staining operations. The stains dry rapidly, at room temperature, and the stained wood can be coated with conventional materials as soon as the stain is dry, without any detrimental effects. When the dyes are dissolved in lacquer coatings, they do not retard the drying rate of the latter appreciably and have no adverse effects on the structure of the resulting film.

The metallized azo dyes which I have referred to above are the complex chromium compounds of monoazo dyestuffs having the formula $$[X-A-N=N-B]-(SO_2-CH_3)_n$$

wherein

A represents a benzene nucleus
B represents the radical of a member selected from the group consisting of phenolic, naphtholic and enolic coupling components, and containing an OH group in o-position to the azo group
X represents a metallizable group selected from the group consisting of OH and COOH, in o-position to the azo group, and
n is one of the integers 1 and 2, the methyl sulfone group being otherwise free from carboxylic acid and sulfonic acid groups Dyestuffs of this type are currently available under the proprietary names of "Irgalan" (J. R. Geigy Co.), "Nyalan" (Nyanza Color and Chemical Co.), and "Chromolan" (National Aniline and Dyestuff Co.).

The solvents appropriate for use in preparing moderately concentrated solutions of the dyes include primary alcohols (aliphatic and/or aralkyl); polyhydric alcohols, e. g., glycols, glycerine, etc.; esters; glycol ethers; ketones; and mixtures, especially mixtures with primary alcohols. The following list of solvents is representative but not limiting:

Methanol
Ethanol
Propanol
Butanol
Glycerine
Ethylene glycol
Propylene glycol
Butylene glycol
Ethylene glycol monoalkyl ethers, e. g., monomethyl, monoethyl, monobutyl, etc.
Diethylene glycol monoalkyl ethers
Acetone
Methyl ethyl ketone
Methyl isobutyl ketone
n-Butyl acetate
Diacetone alcohol
Mixtures of equal parts of methanol and ethanol
A mixture composed of 31 parts of methanol, 9.5 parts ethanol and 2.375 parts toluol The following examples illustrate the best embodiments of the invention presently known to me:

EXAMPLE 1

A dye concentrate was first made utilizing the following materials:

Denatured alcohol _____ gallons__ 32
Nyalan Grey BL _____ pounds__ 1.625

The alcohol was heated to about 100° F. and the dye was dissolved therein. The solution was then allowed to stand for four hours after which it was decanted through suitable filtering media.

The dye concentrate was sprayed at low pressure on birch wood and allowed to dry for a few minutes, after which the stained wood was coated with a lacquer sealer. The stained and coated wood had a light blue color and was found to be very stable against sunlight.

EXAMPLE 2

A dye concentrate was prepared from:

Denatured alcohol _____ gallons__ 64
Methanol _____ do____ 64
Nyalan Red 3-G _____ pounds__ 10
Nyalan Bordeaux 2 BL _____ do____ 1
Nyalan Yellow GL _____ do____ 1
Nyalan Grey BL _____ do____ 1

The dyes were dissolved in the mixed solvents at about 100° F. and the resulting solution was allowed to stand for four hours. The solution was then decanted through a filter medium.

When the clear dye concentrate was applied at a spraying pressure of about 70 p. s. i. to birch wood, the wood exhibited an attractive red cherry color. The stained wood could be coated with lacquer sealer almost immediately, because the high spraying pressure yielded a dry stained surface.

EXAMPLE 3

A dye concentrate was prepared from:

| | |
|---|---|
| Denatured alcohol _____ gallons__ | 42 |
| Irgalan Grey BL _____ pounds__ | 2.5 |

The dye was sifted into the alcohol with stirring, the alcohol being at room temperature. Agitation was continued until all of the dye had been dissolved.

Application of the dye concentrate to birch wood by spraying at 70 p. s. i. pressure yielded an attractive blue-grey color of excellent depth and clarity. The stain surface could be coated with lacquer and other sealers immediately after the stain had been sprayed.

EXAMPLE 4

A dye concentrate was prepared from:

| | |
|---|---|
| Denatured alcohol _____ gallons__ | 32 |
| Irgalan Brown 3 BL _____ pounds__ | 1.625 |

The dye was sifted into the alcohol at room temperature with agitation and agitation was continued until the dye had dissolved. The resulting solution was allowed to stand over night and then was decanted through a filter.

The dye concentrate produced an attractive brown appearance when applied to birch and dried.

Stained panels prepared as described in Examples 1–4 were exposed to daylight by placing them near a window. Similar control panels stained with typical stains heretofore used were similarly exposed. After one week the panels of Examples 1–4 revealed no apparent change in color, while the control panels had been bleached very noticeably. Even a month's exposure showed little change in the color of the panels of Examples 1–4.

It will be noted in Examples 1–4 that no binder is employed in those stains. Nevertheless, when the stains are sprayed at high or low spraying pressure and have become dry, the stained surface is remarkably resistant to abrasion. It can be rubbed with the fingers under considerable pressure without removing the color. However, it should be coated with a clear protective film in order to achieve the durability which is commonly expected nowadays. A lacquer sealer serves this purpose, although other protective coatings such as clear alkyds can be used. The lacquer-type coatings are preferred, however, since they enhance the depth of color and the clarity. This is due partly to the fact that the wet lacquer film dissolves a small part of the dye, thereby producing a colored coating in situ. Alkyd-type coatings tend to give less clarity and depth.

The sealer which is applied directly to the stained surface can, of course, be further coated with additional clear films of any desired chemical nature so long as they develop satisfactory intercoat adhesion to the sealer.

My new stains are outstanding because they make it possible to achieve in a two-step staining and sealing operation a quality of clarity, depth and brilliance seldom encountered with the stains conventionally used heretofore. Moreover, the dyes permit a wider range of colors, shades and tones than was possible formerly, along with greatly enhanced resistance to fading.

The following is an illustration of a shading lacquer.

EXAMPLE 5

A cherry cordovan shading lacquer was prepared as follows:

Solution A

| | |
|---|---|
| Nyalan Grey BL _____ pounds__ | 1 5/8 |
| Nyalan Bordeaux 2 BL _____ do____ | 5/16 |
| Nyalan Yellow 2 RL _____ do____ | 5/8 |
| Methanol _____ gallons__ | 2½ |

Dissolve dyes in methanol at 100° F. Settle and decant.

Solution B

| | |
|---|---|
| 801 P Amberol (Rohm & Haas) maleic treated rosin ester _____ pounds__ | 2.0 |
| Toluol _____ gallons__ | 6.25 |

Dissolve:

| | |
|---|---|
| 5–6″ R. S. nitrocellulose _____ pounds__ | 9.3 |
| Di-butyl phthalate _____ gallons__ | .125 |
| Isopropyl acetate _____ do____ | 1.95 |
| Methyl ethyl ketone _____ do____ | 5.3125 |
| Methyl isobutyl ketone _____ do____ | .1875 |
| Toluol _____ do____ | 6.00 |

Dissolve and add to Amberol solution.

Add solution A to solution B slowly with agitation. The resulting lacquer has an intense transparent black color suitable for high-lighting furniture. Unlike the usual transparent shading lacquer made from oil-soluble azo dyestuff, this lacquer will not migrate from a film on furniture into cloth covers placed over it. It will be many times more permanent in relation to direct sunlight. Unlike shading lacquers made from acid dyestuffs, it will exhibit much better color stability in the package as well as resistance to fading in sunlight.

The oil-soluble colors are based on stearic/oleic fixatives and, as such, tend to retard dry rate as well as to destroy the integrity of the resultant film. My invention does not have this detrimental effect.

The same formulation at higher solids can be used as a transparent lacquer coating suitable for glass, metal, wood or leather.

Having now described my invention, what I claim is:

1. As a novel composition, (I) an organic solvent solution of at least one complex chromium compound of a monazo dyestuff having the formula

[X—A—N=N—B]—(SO$_2$—CH$_3$)$_n$ wherein

A represents a benzene nucleus

B represents the radical of a member selected from the group consisting of phenolic, naphtholic and enolic coupling components, and containing an OH group in o-position to the azo group X represents a metallizable group selected from the group consisting of OH and COOH, in o-position to the azo group, and n is one of the integers 1 and 2, the methyl sulfone group being otherwise free from carboxylic acid and sulfonic acid groups and (II) a binder component composed essentially of lacquer-type film-forming materials.

2. As a novel article of manufacture, a body having a surface portion thereof dyed and coated with a film obtained by coating said portion with a liquid film of the composition as claimed in claim 1, and then drying said film.

3. As a novel article of manufacture, a wood member having a surface portion thereof stained with a non-grain-raising stain for wood composed essentially of an organic solvent solution of at least one complex chromium compound of a monazo dyestuff having the formula

[X—A—N=N—B]—(SO$_2$—CH$_3$)$_n$ wherein

A represents a benzene nucleus

B represents the radical of a member selected from the group consisting of phenolic, naphtholic and enolic coupling components, and containing an OH group in o-position to the azo group X represents a metallizable group selected from the group consisting of OH and COOH, in o-position to the azo group, and $n$ is one of the integers 1 and 2, the methyl sulfone group being otherwise free from carboxylic acid and sulfonic acid groups References Cited in the file of this patent

UNITED STATES PATENTS

| | | |
|---|---|---|
| 2,225,603 | Lubs | Dec. 17, 1940 |
| 2,254,372 | Kvalnes | Sept. 2, 1941 |
| 2,551,056 | Schetty | May 1, 1951 |